United States Patent [19]
D'Aragon

[11] 3,888,767
[45] June 10, 1975

[54] SEWAGE TREATMENT TANK

[76] Inventor: Paul D'Aragon, 525 Stuart Ave., Outremont, Quebec, Canada

[22] Filed: Sept. 27, 1971

[21] Appl. No.: 184,168

Related U.S. Application Data

[63] Continuation-in-part of Ser. No. 872,521, Oct. 30, 1969, abandoned.

[52] U.S. Cl. ............................... 210/151; 210/218
[51] Int. Cl. ......................... C02c 1/04; C02c 1/16
[58] Field of Search ....... 210/16, 17, 150, 151, 195, 210/218, 220, 221, 521

[56] References Cited
UNITED STATES PATENTS

| | | | |
|---|---|---|---|
| 699,345 | 5/1902 | Provost | 210/16 X |
| 963,448 | 7/1910 | Linden | 210/151 |
| 1,439,406 | 12/1922 | Elrod | 210/16 |
| 1,477,894 | 12/1928 | Perry | 210/17 X |
| 1,893,623 | 1/1933 | Imhoff | 210/195 |
| 2,574,685 | 11/1951 | Baxter et al. | 210/221 X |
| 2,852,140 | 9/1958 | MacLaren | 210/221 |

Primary Examiner—Samih N. Zaharna
Assistant Examiner—Thomas G. Wyse
Attorney, Agent, or Firm—Fetherstonhaugh & Co.

[57] ABSTRACT

A sewage treatment tank for houses, garages, hotels, and the like, where there are no sewage collector systems, the tank having separate compartments to digest sewage in successive stages by anaerobs and aerobs.

3 Claims, 6 Drawing Figures

3,888,767

SEWAGE TREATMENT TANK

This application is a continuation-in-part of my earlier copending application Ser. No. 872,521, filed Oct. 30, 1969, now abandoned.

The present invention relates to a sewage treatment tank for the treatment of sewage from houses, hotels, garages, schools, small industries, and the like where normal sewage collector systems do not exist.

The sewage tank contains no mechanically moving parts, and is composed of two adjacent compartments, a first compartment, with a centrally located sewage inlet having a V-shaped launder, open at the bottom. In this first compartment, most of the solids in the sewage are separated from the liquids, and are digested by anaerobs. The liquids are hereinafter referred to as effluent.

The effluent passes from compartment (a) to a second compartment (b) where it is submitted to the action of aerobs in the presence of injected air.

In each compartment there is a pipe immediately adjacent to the wall separating the compartments, and preferrably centrally located. These pipes contain a plurality of holes in their upper portion, immediately below the roof of said compartments, which permits the continuous evacuation of gases produced in both the compartments. Both pipes also permit the removal of digested sediments from said compartments through the base of the pipes at predetermined intervals for cleaning.

The effluent of compartment (a) is fed towards the bottom of compartment (b) through a suitable slot in the wall separating said compartments, and a pipe connection with the gas exhaust pipe of compartment (b).

The products of digestion of the sewage in compartment (a) by anaerobs, include: methane, carbon dioxide, ammonia and amines, hydrogen sulphide and organic sulphur compounds, phosphine and organic phosphorus compounds, and some insoluble humus.

The products of digestion of the effluent from compartment (a) in compartment (b), by aerobs in the presence of injected air include: carbonic gas and carbonates and bicarbonates, some humus, water, nitrites and nitrates, sulphates and phosphates.

Sufficient air is injected into compartment (b), so that the effluent from said compartment contains dissolved air and a nil B.O.D..

In compartment (b), compressed air is injected at the bottom end of a slightly inclined inverted tray, the tray having a series of small open compartments, similar to ice trays for refrigerators, so that the air travelling from the bottom end to the top end of the tray is in immediate contact with the effluent for a relatively long period of time, the air then passes under a series of similar trays, which are overlying and mounted above each other, so that the oxygen contained in the injected air has sufficient time to effect the biological digestion by aerobs.

In one embodiment a tank having compartments of equal volume, to treat sewage for a dwelling occupied by eight persons would be about 5 feet wide, 6 feet high and 8 feet long. This size is determined from the assumption that a single person produces approximately 60 gallons of sewage per day, and considering the volume taken up by digested sediments, sufficient space must remain for easy removal of the gases. Each compartment is approximately 5 feet wide, 6 feet high and 4 feet long.

The tanks may be made of many materials, wood rendered impervious, or plastics are both satisfactory materials.

For the easy removal of the accumulated sediments in both compartments (a) and (b) of the present embodiment, pipes for evacuating the gases have an internal diameter of about 4 inches, so that a hose or a pipe may be easily inserted in pump. Some sediment should always remain in both compartments, to allow the biological digestion of both anaerobs and aerobs in their respective compartments (a) and (b) to continue.

To have good biological digestion by aerobs in compartment (b), an excess of air is preferably injected. About 2 cubic feet of air per gallon of sewage is the preferred quantity. In the present embodiment, about 1,000 cubic feet of air are required. A relatively small compressor operating under a head of about 2 lbs. gauge pressure is satisfactory. For the present embodiment, a motor using 12 to 15 watts is required. The motor should preferably be operated continuously.

The final effluent is practically free of colliforms, micro-organisms and other bacteria. Soluble salts are contained in the effluent, and some of these salts such as nitrites, nitrates and phosphates may be objectionable, as they constitute excellent fertilizers, and in reaching either a lake or a river, they promote the growth of aquatic plants.

Therefore, as a preferred embodiment, a third small compartment is added in which the effluent of compartment (b) comes in contact with lime, thereby producing nearly insoluble salts of nitrites, nitrates and phosphates.

At other places where it is feasible, plants and/or trees could be made to grow along the path of the final effluent, where fertilizing salts contained in said effluent would be mostly absorbed by said plants and/or trees.

In drawings which illustrate embodiments of the invention,

Figure 1:
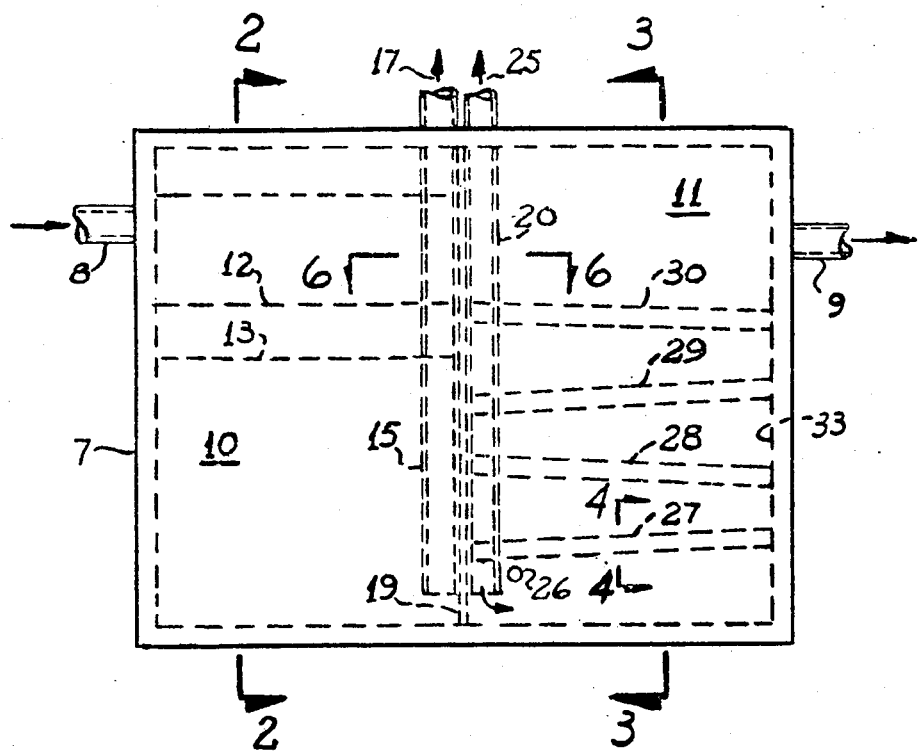
FIG. 1 is an elevational view of one embodiment.

In referring to the drawings, FIG. 1 shows a sewage treatment tank 7, with a sewage entry pipe 8, and a final effluent exit pipe 9.

The sewage treatment tank 7 is divided into a first compartment 10 and a second compartment 11. In the first compartment 10, the sewage is digested by anaerobs, and in the second compartment 11 the effluent from the first compartment 10 is digested by aerobs in the presence of injected air.

Figure 2:
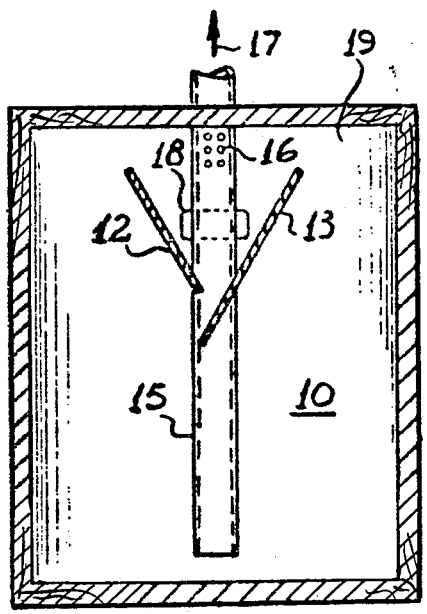
FIG. 2 is a section on the line 2—2 of FIG. 1.

The sewage, introduced in compartment 10 through pipe 8, is immediately led into a V-shaped, open bottom launder formed by two plates 12 and 13 of unequal widths as illustrated in FIG. 2. In the V-shaped launder, plate 12 is of smaller width than plate 13, so that while having sufficient place for the settling of the solids between plates 12 and 13 to the bottom of compartment 10, gases produced by the digestion of the solids by anaerobs rise to the surface of the sewage mainly outside the plates 12 and 13, and do not interfere with the separation of the solids from the liquids between plates 12 and 13.

The escape of the gases from compartment 10 is through a plurality of holes 16 existing in the upper portion of a gas exhaust pipe 15 mounted adjacent to a wall 19 separating compartments 10 and 11 into comparatively equal sizes. The gases are led to the atmosphere as per arrow 17.

Figure 3:
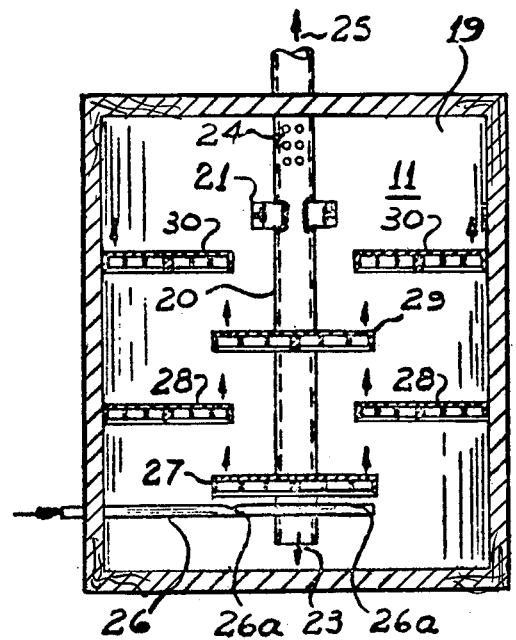
FIG. 3 is a section on the line 3—3 of FIG. 1.
Figure 6:
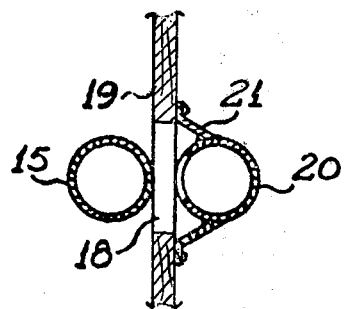
FIG. 6 is a section on the line 6—6 of FIG. 1.

The effluent from compartment 10 is fed through a slot 18 made in wall 19 lying between compartments 10 and 11, into a pipe 20, by means of a joint 21, such as illustrated in FIG. 6. The effluent of compartment 10 exits at the bottom of said pipe 20, into compartment 11 as per arrow 23 shown in FIG. 3.

Pipe 20, like pipe 15, has a plurality of small holes 24 in the upper portion inside compartment 11, so that the gases produced by the aerobic digestion of the effluent of compartment 10, and any residual injected air are led to the atmosphere as per arrow 25. A small air compressor, (not shown) located outside of the sewage tank, feeds air to pipe 26, which has holes 26A at convenient points underneath an inverted tray 27. The tray 27 is slightly inclined from wall 19 to the outer wall 33 of the tank 7, so that the air injected at the bottom end of the tray 27, slowly bubbles up under the tray 27 through a whole series of little cups 31 in the underside of the tray 27.

Figure 4:
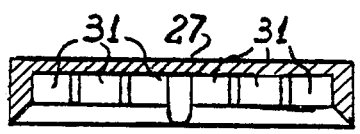
FIG. 4 is a section on the line 4—4 of FIG. 1, showing a tray at a larger scale.
Figure 5:
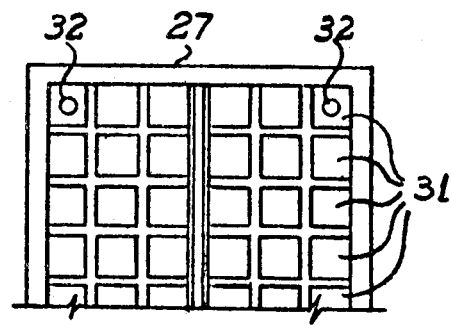
FIG. 5 is a partial bottom plan view of the upper end of the tray shown in FIG. 4.

In the present embodiment of sewage treatment tank 7, four overlying rows of air trays, 27, 28, 29 and 30 are shown from the bottom to the top of compartment 11. Air is injected by means of the compressed air pipe 26 at the bottom of tray 27, and air slowly bubbles up under the tray 27 through a series of little cups 31, as illustrated in FIGS. 4 and 5. At the top end of the tray 27, the air escapes upwards through two holes 32 positioned in the corners of the tray 27. This escaping air is captured by two side trays 28 which overlap and slope in the opposite direction to tray 27. The air passes along these side trays 28, bubbles up to another central tray 29 and then to two more side trays 30. The final air escapes close to the wall 19 and the gas produced and unused air escapes through holes 24 into pipe 20 so as to cause the least disturbance in the liquids close to the final effluent exit pipe 9 and to avoid entraining solids in the final effluent. This air treatment in compartment 11, ensures a full aerated liquid effluent leaving through exit pipe 9, free of noxious bacteria.

In the above description, a rectangular sewage treatment tank, with two equal compartments has been described. This embodiment includes a solid-liquid separation V-shaped launder, together with air trays and their disposition, however, it will be obvious to those skilled in the art, that sewage treatment tanks may be made of various sections, and different size compartments. Furthermore, the air trays may be of different shapes and dispositions without effecting the scope of the present invention. Several different materials may be used when constructing such sewage treatment tanks.

Due to the evolution of carbonic gases in both compartments of the tank, some crushed limestone is preferably added to both compartments, as some of the carbonic gases tend to dissolve with limestone, and help to maintain a needed basic condition in the tank. The limestone also helps to precipitate most of the phosphates which are promoters of aquatic growths in lakes and rivers in which the final effluent may discharge.

What is claimed as new is:

1. A sewage treatment tank in which sewage is subjected to the action of anaerobs followed by the action of aerobs, the tank comprising in combination, a first digester compartment having a sewage entrance and adapted to digest solid sewage by action of anaerobs thereby producing gases, an open bottom lander disposed in said first compartment spaced inwardly from the walls parallel thereto and adapted to separate sewage into solid and liquid, a gas exit pipe for said first compartment, a second digester compartment, conduit means for conveying liquid sewage from the first compartment to the lower portion of the second compartment, a plurality of inverted trays in the second compartment arranged in series, one above another, each tray slanting in an opposite direction relative to and overlapping the tray immediately beneath it, means for injecting air into the second compartment below the lowermost tray whereby to digest liquid sewage by aerobs and produce gases, each slanted tray including a set of inverted cups adapted to bubble air from lower cups to upper cups of each tray and an aperture in an upper cup of each tray through which aperture the air bubbles from the upper cups of each tray to lower cups of the next higher tray, an exit pipe for evacuated gases and excess air provided on the second compartment, and an effluent discharge provided on the second compartment.

2. The device as defined in claim 1 wherein said first and second compartments are defined by a single tank having a partition between the two compartments, said gas exit pipes of the two compartments being disposed at the opposite sides of said partition and upper portions of said pipes being apertured to communicate with the resepective compartments.

3. The device as defined in claim 3 wherein the gas exit pipe of the second compartment has an opening communicating through said partition with the first compartment and constitutes said conduit means for conveying liquid sewage from the first to the second compartment.

* * * * *